United States Patent
Levine et al.

(10) Patent No.: US 10,184,266 B1
(45) Date of Patent: Jan. 22, 2019

(54) FLEXIBLE SHEET FOR FORMING A SEMI-RIGID STRUCTURE

(71) Applicant: X Development LLC, Mountain View, CA (US)

(72) Inventors: Gabriella Levine, New York, NY (US); Richard Wayne DeVaul, Menlo Park, CA (US)

(73) Assignee: X Development LLC, Mountain View, CA (US)

( * ) Notice: Subject to any disclaimer, the term of this patent is extended or adjusted under 35 U.S.C. 154(b) by 591 days.

(21) Appl. No.: 14/744,814

(22) Filed: Jun. 19, 2015

(51) Int. Cl.
| | | |
|---|---|---|
| *B32B 3/12* | (2006.01) | |
| *B32B 3/26* | (2006.01) | |
| *B32B 1/08* | (2006.01) | |
| *E04H 15/54* | (2006.01) | |
| *E04H 15/58* | (2006.01) | |
| *B05D 5/00* | (2006.01) | |

(52) U.S. Cl.
CPC .............. *E04H 15/54* (2013.01); *B05D 5/00* (2013.01); *B32B 3/12* (2013.01); *B32B 3/26* (2013.01)

(58) Field of Classification Search
CPC ......... E04H 15/20; E04H 15/54; E04H 15/58; E04H 15/34; E04H 15/203; E04H 15/205; E04B 1/168; E04B 1/169; Y10T 428/234; Y10T 428/249994; Y10T 428/249995; Y10T 428/249997; Y10T 428/24157; B32B 1/08; B32B 3/12; B32B 3/26
See application file for complete search history.

(56) References Cited

U.S. PATENT DOCUMENTS

| | | | |
|---|---|---|---|
| 4,482,414 A * | 11/1984 | Schonberger | ........... A61F 13/04 156/79 |
| 5,318,556 A | 6/1994 | Avallone et al. | |
| 5,624,727 A | 4/1997 | Stoy | |
| 6,910,308 B2 | 6/2005 | Cadogan et al. | |
| 7,181,877 B2 * | 2/2007 | Quade | ..................... E04H 15/20 40/610 |
| 7,694,978 B2 * | 4/2010 | Starr | ........................ F02F 11/00 156/291 |
| 7,735,265 B2 | 6/2010 | Tinker et al. | |
| 2004/0209026 A1 * | 10/2004 | Bertram | ................ B29C 44/183 428/35.2 |
| 2005/0151007 A1 | 7/2005 | Cadogan et al. | |
| 2006/0255171 A1 * | 11/2006 | Krupenkin | ............. B01D 69/06 239/44 |
| 2012/0251835 A1 * | 10/2012 | Dry | ........................ B29C 73/22 428/454 |
| 2012/0325965 A1 | 12/2012 | Bright et al. | |

* cited by examiner

*Primary Examiner* — Joanna Pleszczynska
(74) *Attorney, Agent, or Firm* — Christensen O'Connor Johnson Kindness PLLC

(57) ABSTRACT

Techniques and mechanisms to form a semi-rigid structure from a flexible sheet. In an embodiment, a portion of the flexible sheet includes layer portions and one or more compartments each disposed between said layer portions. The one or more compartments each having disposed therein a first fluid compound that is reactive—e.g., when exposed to oxygen, heat, ultraviolet (or other) light, or a different fluid compound—to form a solid. In another embodiment, a graphic printed on the flexible sheet indicates a location of the one or more compartments. Activation of the one or more compartments and bending of the flexible sheet portion at the activated one or more compartments aids in the formation of a shelter or other semi-rigid structure.

16 Claims, 7 Drawing Sheets

FLEXIBLE SHEET FOR FORMING A SEMI-RIGID STRUCTURE

BACKGROUND

1. Technical Field

This disclosure relates generally to the formation of a semi-rigid structure and more particularly, but not exclusively, to the formation of a shelter structure with a flexible sheet.

2. Background Art

Flooding, earthquakes, landslides, famine, war, and fire are just some examples of disasters that suddenly give rise to a demand that shelter be provided quickly and efficiently. When such events occur, shelter is typically needed immediately, on a large scale and in remote and/or poor areas of the world—not only for refugees, but often for physicians, firefighters or other aid workers. Disaster relief is just one example of an area of human endeavor that could be improved by efficient technologies for generating at least partially rigid structures. Immigration and homelessness are other, more long term causes for shelter being needed in resource limited situations. Being able to rapidly deploy such shelter is a constant challenge to governments, private relief agencies and other organizations.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments discussed herein variously provide techniques and mechanisms for providing a flexible sheet that is efficiently transportable and deployable to form an at least semi-rigid structure. Certain embodiments provide for techniques to manufacture and/or use such a flexible sheet. In the description herein, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
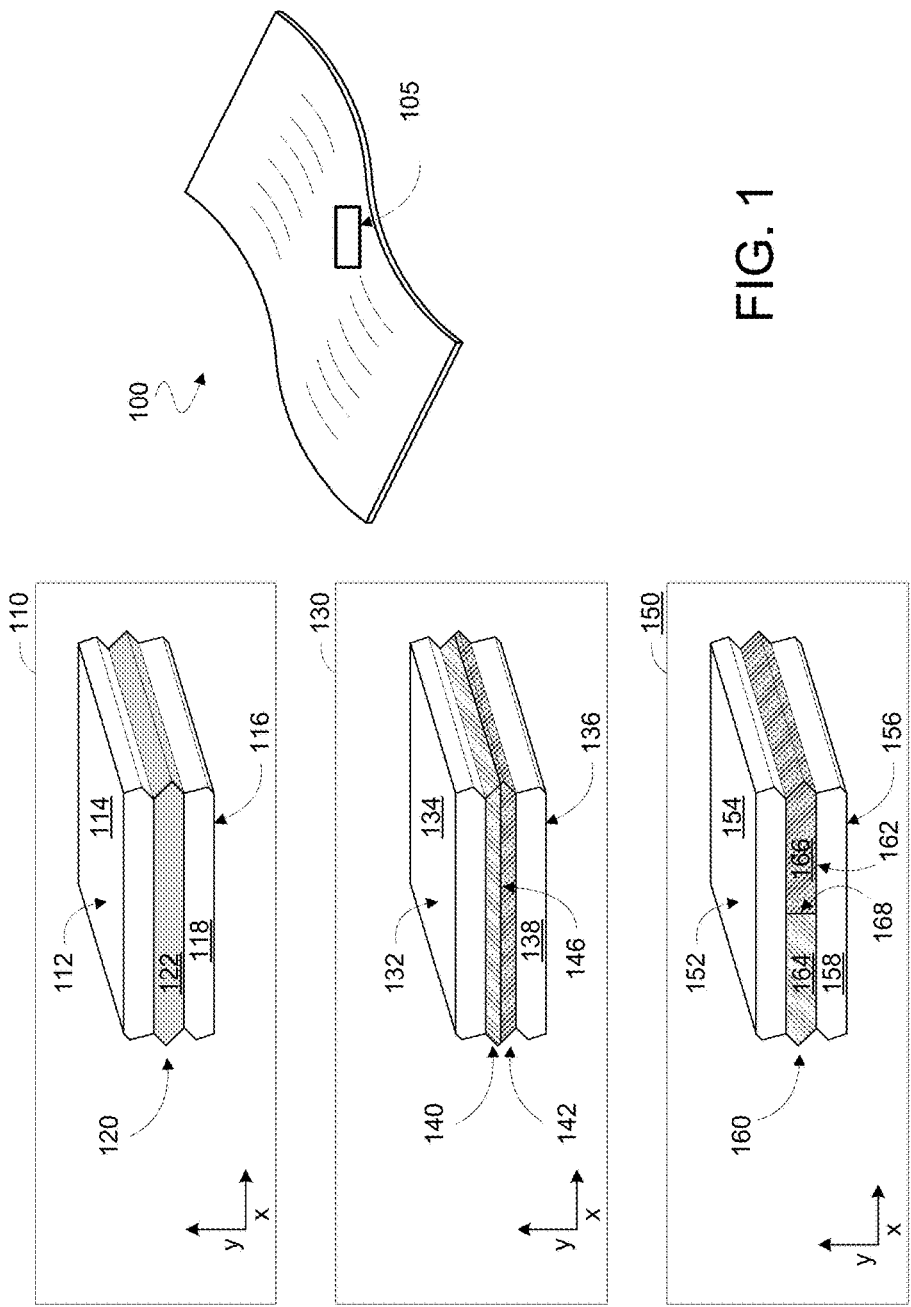
FIG. 1 is a perspective view diagram illustrating elements of a flexible sheet to form a semi-rigid structure according to an embodiment.

FIG. 1 illustrates elements of a flexible sheet 100 that may be activated to form a semi-rigid structure according to an embodiment. Flexible sheet 100 may be a portion of a single sheet or one of multiple sheet portions (not shown) that have been stitched, glued or otherwise joined with one another. In an embodiment, flexible sheet 100 provides for bending into one or more of a bolt, roll, folded stack, etc.

Portions of flexible sheet 100 may be cut, scored, hammered and/or otherwise activated at pre-defined seams. Such activation may include cutting, rupturing or otherwise compromising the integrity of an internal enclosure of flexible sheet 100, resulting in chemical reaction by an epoxy or other reactive compound disposed in the compromised enclosure. A reaction including the reactive fluid may then result in the formation of a solid that extends across an area in or on at least part of flexible sheet 100. The solid may contribute to the formation of one or more semi-rigid regions of flexible sheet 100—e.g. for the formation of a three-dimensional structure.

In an embodiment, flexible sheet 100 includes a first layer portion forming a first exterior surface and a second layer portion forming a second exterior surface. Certain features of various embodiments are described herein with reference to a portion 105 of flexible sheet 100. However, such description may be extended to additionally or alternatively apply to any of a variety of other such flexible sheet portions, according to different embodiments. Cross-sectional detail views 110, 130, 150 show respective alternative structures of flexible sheet portion 105 each according to a corresponding embodiment. As shown in cross-sectional detail view 110, portion 105 may include a layer portion 114 forming a first exterior surface 112 and another layer portion 118 forming a second exterior surface 116. Features of layer portion 114 and/or layer portion 118 (e.g., thickness, material, weaving, thread size, etc.) may be chosen to achieve particular characteristics of portion 105. Such characteristics—e.g., to suit a given application—may include, for example, flexibility, ability to form a bond with another layer portion and/or with a reactive compound, mechanical strength, resistance to impacts, tearing, etc., resistance to environmental conditions (temperature, moisture, gasoline, solvents and/or the like), lubricity, electrical insulation, easy of fabrication and/or the like. In one embodiment, one or each of layer portions 114, 118 has a thickness (along the y-axis shown) between 0.006" and 0.1"—e.g., where the flexible sheet 100 has a total thickness of 0.4" or less. Additionally or alternatively, flexible sheet 100 may be have a width of more than two feet and a length of more than two feet, for example. However, such dimensions are illustrative, and may vary according to implementation-specific details.

One or each of layer portions 114, 118 may include any of a variety of textiles and/or other flexible materials. For example, a layer portion of flexible sheet 100 may include one or more of a paper, rubber, latex, plastic or other impermeable film material. A textile of the layer portion may include woven or otherwise processed natural fibers comprising cotton, wool, hemp and/or the like. Alternatively or in addition, the textile may include polyester, acrylic, nylon, rayon, Gore-Tex®, carbon fiber and/or other synthetic fibers. In an embodiment, one or more layers of flexible sheet portion 100 include a polycarbonate material, or an acetal resin material such as Delrin® from E. I. du Pont de Nemours and Company of Wilmington, Del. Certain embodiments are not limited with respect to a particular flexible material of layer portion 114 and/or layer portion 118.

Respective regions of layer portions 114, 118 (not shown) may be stitched, glued, melted, laminated or otherwise joined with one another. Alternatively, regions of a single, contiguous layer of material may be cut or otherwise split from one another to form layer portions 114, 118. In some embodiments, one or each of layer portions 114, 118 includes multiple component layers of material (not shown). A compartment 120 may include, or be formed by, a channel or other region where layer portions 114, 118 are not in direct contact with one another. For example, a sidewall of compartment 120 may be formed at least in part by an interior side of a film layer portion that also forms one of exterior surfaces 112, 116. One or more edges of compartment 120 may be defined by a seal formed by bonding and/or other adhesion between layer portions 114, 118. Alternatively, compartment 120 may be or otherwise include a bladder, balloon, pouch, sack, vesicle, etc. or other enclosed structure (referred to herein as a "cell") disposed between layer portions 114, 118.

Compartment 120 may contain a compound 122 that is reactive to form a solid. For example, fabrication of flexible sheet 100 may include stacking layer portions 114, 118, where one or more enclosures containing glue, epoxy or another such reactive compound are sandwiched between such layer portions. Compound 122 may comprise any of a variety of liquid reagents, reactants, co-reactants, or other such chemicals capable of participating in a chemical reaction—e.g., in the presence of air (e.g., oxygen), heat, water, ultraviolet or other light and/or another liquid compound. Compound 122 may comprise a glue, hardener and/or other suitable substance. By way of illustration and not limitation, compound 122 may comprise a cyanoacrylate, polyurethane, or acrylic fluid that reacts in the presence of oxygen. In another embodiment, compound 122 comprises a nonvolatile urethane pre-polymer, a silicon adhesive or other fluid that reacts in the presence of water. In still another embodiment, compound 122 comprises any of various fluids—e.g., an epoxy resin, phenol formaldehyde resin, polyurethane, etc.—that cures in response to heat.

As shown in cross-sectional detail view 130, a flexible sheet portion (e.g., portion 105) according to another embodiment may include a layer portion 134 forming an exterior surface 132 and another layer portion 138 forming another exterior surface 136. Layer portions 134, 138 may have some or all of the features of layer portions 114, 118, for example. A region between layer portions 134, 138 may include, or have disposed therein, compartments 140, 142 containing respective compounds that are reactive with each other to form a solid. By way of illustration and not limitation, respective compounds contained in compartments 140, 142 may include epichlorohydrin and bisphenol A (to form a diglycidyl ethers resin), epichlorohydrin and an aliphatic alcohol (to form a glycidyl ether), or epichlorohydrin and an aromatic amine (to form a glycidylamine epoxy resin). In other embodiments, compartments 140, 142 contain respective halves of a methyl methacrylate two-component adhesive, a two-component silicon adhesive or a two-component urethane adhesive. Any of a variety of additional or alternative reactive compounds may be contained in compartments 140, 142, according to different embodiments.

One or each of compartments 140, 142 may be formed at least in part by an intermediary layer of material—e.g., represented by the illustrative boundary 146. At least a portion of boundary 146 may extend in parallel with, and between, layer portions 134, 138. A material of boundary 146 may be the same as that of one (or both) of layer portions 134, 138, although certain embodiments are not limited in this regard. As compared to layer portion 134 and/or layer portion 138, boundary 146 may be more susceptible to being scored, cut or otherwise ruptured. For example, boundary 146 may be more thin, brittle, lightweight and/or the like. In one embodiment, boundary 146 comprises a film of plastic, nylon or other material that is impermeable to a compound contained in one or each of compartments 140, 142. In another embodiment, a thickness of at least part of boundary 146 spans the separation between layer portions 134, 138, where compartments 140, 142 are formed at least in part by respective recesses in opposite sides of boundary 146.

As shown in cross-sectional detail view 150, a flexible sheet portion (e.g., portion 105) according to another embodiment may include a layer portion 154 forming an exterior surface 152 and another layer portion 158 forming another exterior surface 156. Layer portions 154, 158 may have some or all of the features of layer portions 114, 118, for example. A region 160 between layer portions 154, 158 may form, or have disposed therein, compartments 164, 166 containing respective compounds that are reactive with each other to form a solid. Compounds contained in compartments 164, 166 may have some or all of the features of the compounds contained in compartments 140, 142. One or each of compartments 164, 166 may be formed at least in part by a layer of material—e.g., represented by the illustrative boundary 168—that extends along and spans the thickness (y-axis) of region 160. A material of boundary 168 is the same as that of one (or both) of layer portions 154, 158, although certain embodiments are not limited in this regard. A material of boundary 168 may have features such as those of boundary 146.

Figure 2:
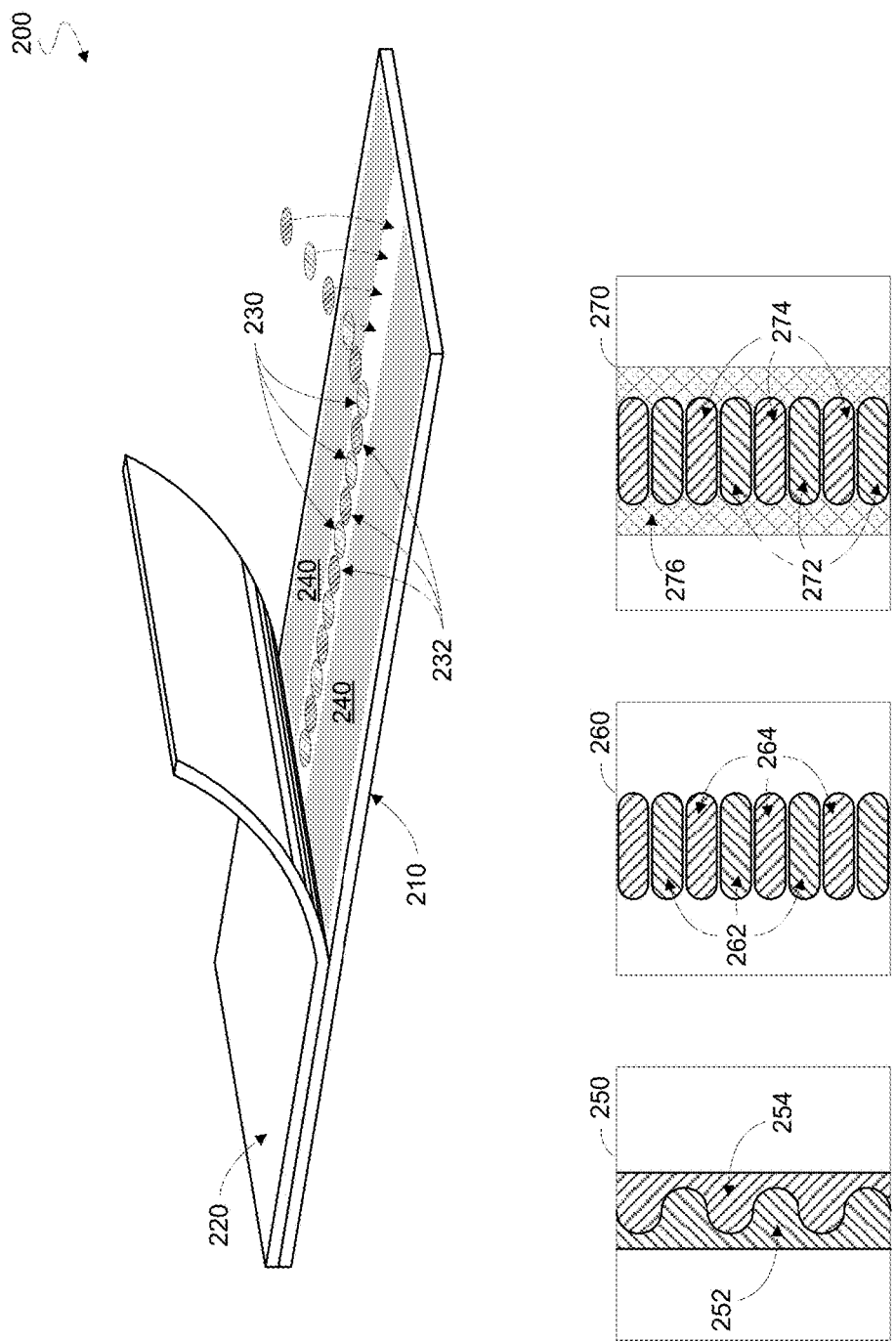
FIG. 2 is a perspective view diagram illustrating fabrication processing to form a flexible sheet according to an embodiment.

FIG. 2 illustrates an assembly 200, according to an embodiment, of a flexible sheet (such as sheet 100) which can be activated to form a semi-rigid structure. Assembly 200 may include forming layer portions and one or more compartments between such layer portions. By way of illustration and not limitation, areas 240 of a first layer 210 may be laminated, stitched, melted, glued or otherwise adhered to opposing areas of a second layer 220—e.g., where such areas join to form a side of a channel or other region where layers 210, 220 are not directly adhered to one another. Layers 210, 220 may include some or all of the features of layer portions 114, 118, for example. In an embodiment, layers 210, 220 may be subjected to curing—e.g., by application of pressure, heat and/or light (e.g., ultraviolet)—to from a seal along sides of the region between areas 240.

Prior to or during the joining of layers 210, 220 to one another, such a region between areas 240 may have one or more reactive compounds disposed therein. By way of illustration and not limitation, one or more cells 230 may be placed in the region between areas 240 before layer 220 is placed over areas 240. The one or more cells 230 may comprise encapsulated structures—e.g., having walls of plastic, nylon or another impermeable material—that have disposed therein a compound that is reactive with air, another compound, etc. to form a solid. In another embodiment, a single bulk fluid reactive compound is injected or otherwise disposed directly into the sealed region between areas 240—e.g., where the layers 210, 220 are directly in contact with the reactive compound. Formation of cells 230 may include one or more operations adapted from conventional molding, injection, sealing, and/or other techniques for forming sealed sacks or other enclosed structures having liquid disposed therein. Such conventional techniques are not detailed herein to avoid obscuring features of various embodiments. The region between areas 240 may accommodate a compound seeping from some or all of the one or more cells 230—e.g., in response to cutting, hammering, heating or other activation conditions that compromise the structural integrity of one or more cells 230. Alternatively or in addition, the region between areas 240 may accommodate expansion of substances that form during chemical reaction in the region.

The one or more cells 230 may each have disposed therein a fluid compound that is reactive—e.g., with air—to form a solid. In some embodiments, the compound is reactive with another fluid stored in other cells of the flexible sheet—e.g., as represented by the illustrative one or more cells 232. The one or more cells 230 may each include a first fluid compound, and one or more cells 232 each include a second fluid compound which is co-reactant with the first fluid compound—e.g. wherein the fluids form a two-part epoxy. In an embodiment, areas 240 of layer 210 may be subjected to processing which is different from processing of the region including cells 230, 232. For example, only areas 240 may be selectively exposed to heat, pressure, radiation and/or other curing processing to adhere areas 240 to layer 220.

Detail views 250, 260, 270 illustrate various arrangements of enclosures (e.g., compartments or cells in a compartment) that may be each be included in a flexible sheet according to a corresponding embodiment. For example, an arrangement of cells 230, 232 may include one of the arrangements shown in detail views 250, 260, 270. As shown in detail view 250, cells 252, 254 (or alternatively, compartments) of a flexible sheet portion may form corrugations or other interleaved structures between layers of the flexible sheet portion. A fluid compound stored in cell 252 may be reactive with a different fluid compound stored in cell 254 to form a solid. Scoring or cutting of such a flexible sheet portion along a straight (or gradually curved) line may break the walls of cells 252, 254 at multiple locations, providing for improved intermixing and reaction of the respective compounds from cells 252, 254 with one another to form the solid in or on the area shown in detail view 250.

As shown in detail view 260, cells 262 (or compartments) of a flexible sheet portion may be interleaved with, or otherwise alternate with, cells 264 along a line between layers of the flexible sheet portion. A fluid compound stored in cells 262 may be reactive with a different fluid compound stored in cells 264 to form a solid. The alternating arrangement of cells 262, 264 allows for improved intermixing and reaction of different respective compounds due to scoring or cutting of the flexible sheet portion along a straight (or gradually curved) line crossing cells 262, 264.

Detail view 270 shows an alternative arrangement, according to a different embodiment, to that of detail view 260. In detail view 270, cells 272 are positioned to alternate with cells 274 along a line between layers of the flexible sheet portion. Furthermore, a fabric portion 276 (also referred to herein as a 'backing fabric' or 'backing material') is adjacent to cells 272, 274 between such layers. Fabric portion 276 may be distinct from any layer portion that forms an exterior surface of the flexible sheet. The fabric portion 276 may include a gauze or other relatively loosely woven textile (e.g., including natural fiber and/or synthetic fiber) that is to aid in wicking, absorption or other distribution of one or more fluid compounds that are to form a solid. For example, cutting or scoring of cells 272, 274 may result in respective fluid compounds being drawn from cells 272, 274 into fabric portion 276 prior to and/or during reaction of such fluid compounds—e.g., with air or each other—to form a solid. Formation of at least part of such a solid in the fabric portion 276 may aid in mechanical support in the resulting semi-rigid structure. For example, fabric portion 276 may provide for increased and/or more uniform distribution of regions hardened by the solid formed by the compounds' reaction.

Figure 3A:
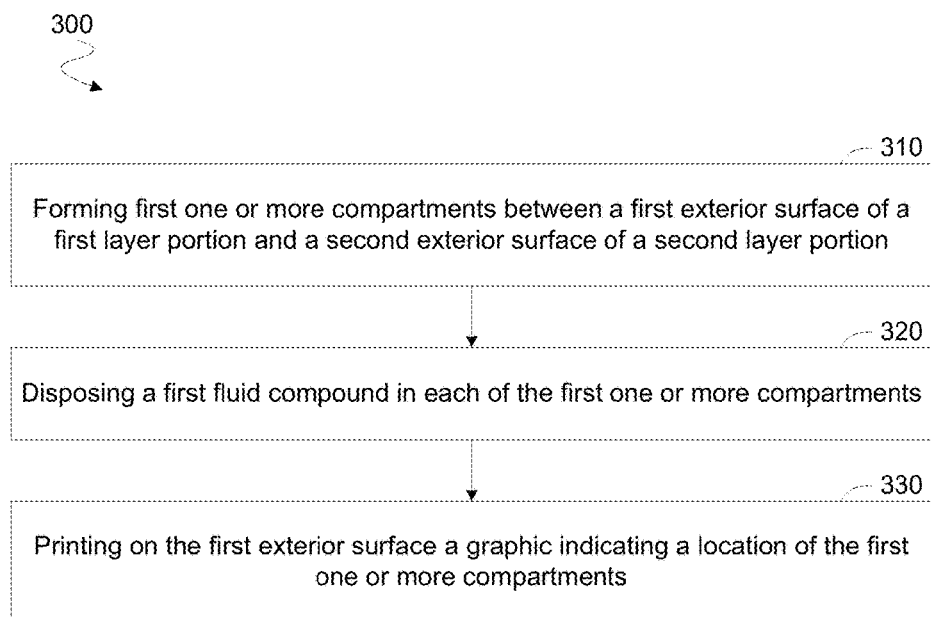
FIG. 3A is a flow diagram illustrating elements of a method for fabricating a flexible sheet according to an embodiment.

FIG. 3 illustrates elements of a method 300 for fabricating a flexible sheet according to an embodiment. Operations of method 300 may fabricate one or both of flexible sheet portions 100, 200, for example.

In an embodiment, method 300 includes, at 310, forming first one or more compartments between a first exterior surface of a first layer portion and a second exterior surface of a second layer portion. The forming at 310 may include laminating, melting, gluing, stitching or otherwise joining together different respective regions of layers of material such as layers 210, 220, to form a seal adjoining (e.g. extending around) a compartment area where the layers of material are not directly joined to one another.

Method 300 may further comprise, at 320, for each of the first one or more compartments, disposing a first fluid compound in the compartment, wherein the first fluid compound is reactive to air or a second fluid compound to form a solid. The disposing at 320 may include placing in a compartment one or more cells, such as cells 230, each having the first fluid compound disposed therein. Alternatively, the disposing at 320 may include injecting or otherwise placing the first fluid compound directly in a compartment. In an embodiment, method 300 further comprises disposing, in one or more compartments, a different fluid compound that is reactive with the first fluid compound to form a solid. Disposing of the different fluid compound in a compartment may include disposing in the first one or more compartments second one or more cells each containing the different fluid compound. Alternatively or in addition, disposing of the different fluid compound may include injecting or otherwise placing the different fluid compound in second one or more compartments that are also between the first layer portion and the second layer portion.

Although certain embodiments are not limited in this regard, method 300 may further comprise, at 330, printing on the first exterior surface (and/or on the second exterior surface) a graphic indicating a location the first one or more compartments. For example, the one or more compartments may form or be positioned along a set of straight lines and/or curved lines that, for example, define a tessellation (or other) pattern. The graphic may mark the set of lines to indicate areas of the flexible sheet are to be folded and/or activated in aid of formation of a semi-rigid body. In some embodiments, the graphic includes text, symbols or other elements further indicating, for example, a perspective view of the semi-rigid shape to be formed, a direction in which an area of the flexible sheet portion is to be folded, an order in which areas of the flexible sheet portion are to be folded and activated, and/or the like.

Figure 3B:
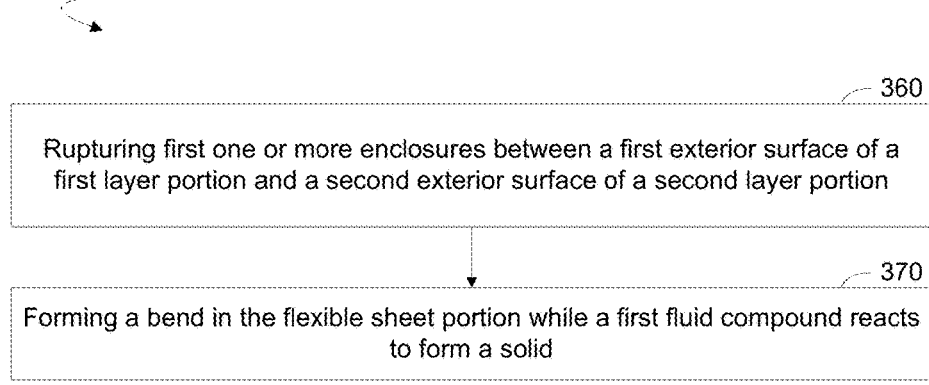
FIG. 3B is a flow diagram illustrating elements of a method to form a semi-rigid structure with a flexible sheet according to an embodiment.

FIG. 3B illustrate element of a method 350 for forming a semi-rigid structure with a flexible sheet according to an embodiment. Method 350 may include operations to activate a flexible sheet portion fabricated according to method 300. In an embodiment, method 350 includes, at 360, rupturing first one or more enclosures each disposed between the first exterior surface of a flexible sheet portion and a second exterior surface of the flexible sheet portion. The rupturing at 360 may comprise cutting, scoring, tearing, melting, pinching, crushing or otherwise compromising an integrity of an impermeable material forming at least part of an enclosure. The first one or more enclosures may comprise a compartment—such as that formed between areas 240. Alternatively or in addition, the first one or more enclosures may comprise a cell disposed within such a compartment. The first one or more enclosures may have disposed therein a first fluid compound that is reactive with air (or with a second fluid compound, in some embodiments) to form a solid. The rupturing at 360 may release the first fluid compound from the first one or more enclosures or otherwise subject the first fluid compound to chemical reaction.

Method 350 may further comprise, at 370 forming, after the rupturing, a bend in the flexible sheet portion while the first fluid compound reacts to air (or a second fluid compound) to form a solid within the flexible sheet portion. For example, method 350 may further comprise, concurrently with the rupturing at 320, rupturing second one or more enclosures each disposed between the first exterior surface and the second exterior surface. The second one or more enclosures may each contain a second fluid compound to react with the first fluid compound. The bend formed at 370 may take place before or during the formation of the solid, allowing the shaping of a structure that will eventually include at least semi-rigid portions.

Figure 4:
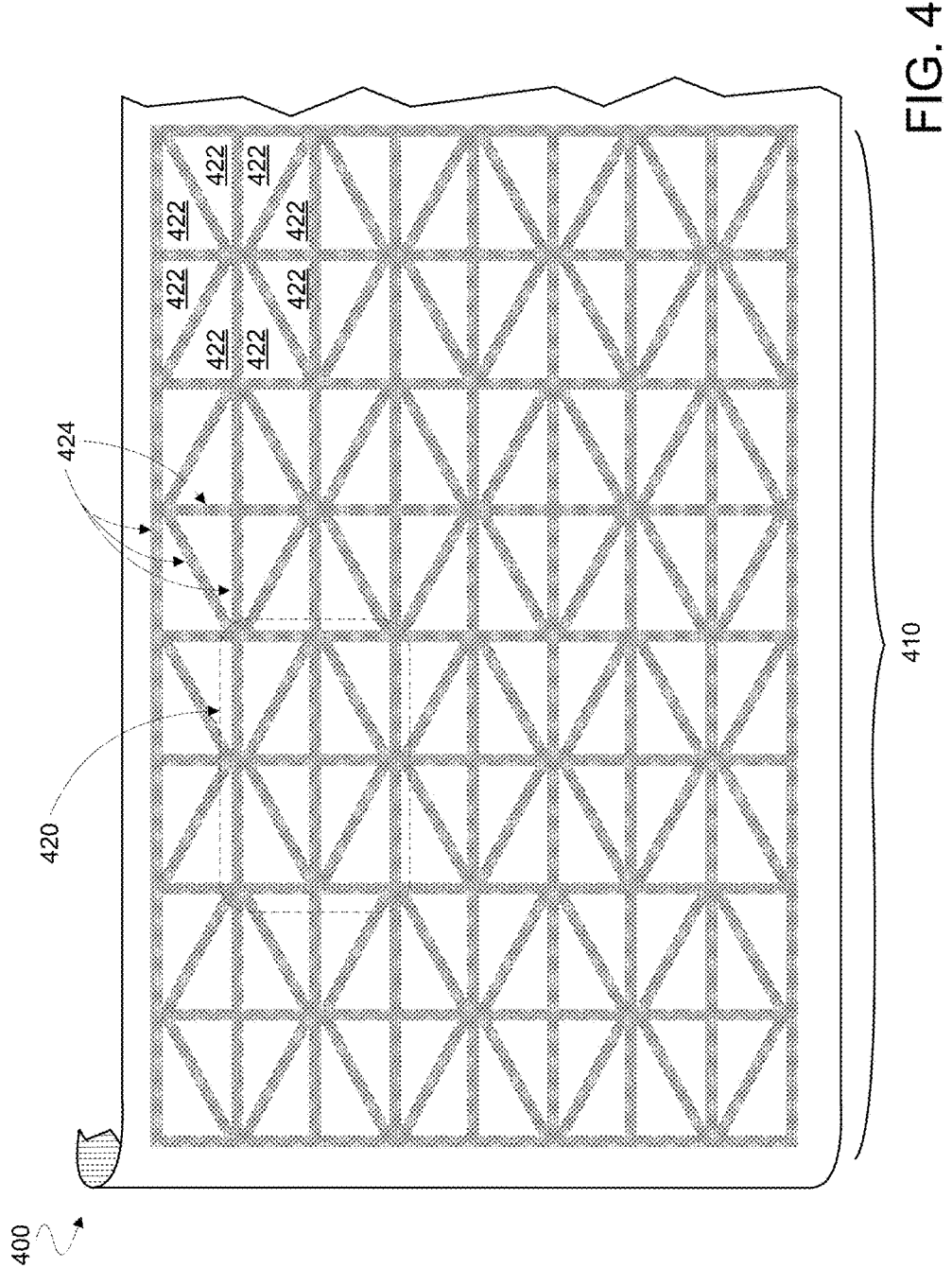
FIG. 4 is a top view diagram illustrating elements of a flexible sheet according to an embodiment.

FIG. 4 illustrates elements of a flexible sheet portion 400 including a pattern 410 of compartments that may be activated to aid in the formation of a semi-rigid structure according to an embodiment. Flexible sheet portion 400 may include some or all of the features of flexible sheet 100, for example. Fabrication of flexible sheet portion 400 may include operations of method 300, in an embodiment.

FIG. 4 represents just one example of a pattern 410 that may be formed by regions 424 where opposing layers (e.g., layers 210, 220) of flexible sheet portion 400 are not in direct contact with one another, and other regions 422 where such layers of flexible sheet portion 400 are in direct contact with one another. Regions 424 may comprise one or more compartments having disposed therein a first fluid compound that is reactive with one or more of air, heat, light (e.g., UV light) and a second fluid compound to form a solid. In some embodiments, such one or more compartments, or one or more other compartments or regions 424, may have disposed therein a different fluid that is reactive with the first fluid compound. Regions 422 may be distinguished from regions 424 by graphics that are printed on flexible sheet portion 420. In one illustrative embodiment, a total area of all regions 424 is less than one-fourth (e.g., less than one-eighth) a total area of all regions 422.

Figure 5:
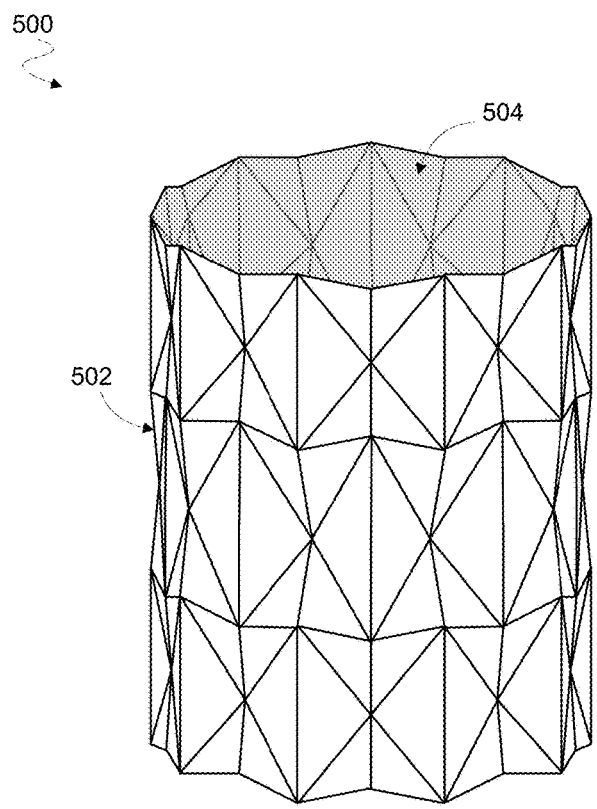
FIG. 5 is a perspective view diagram illustrating elements of a semi-rigid structure formed with a flexible sheet according to an embodiment.
Figure 5:
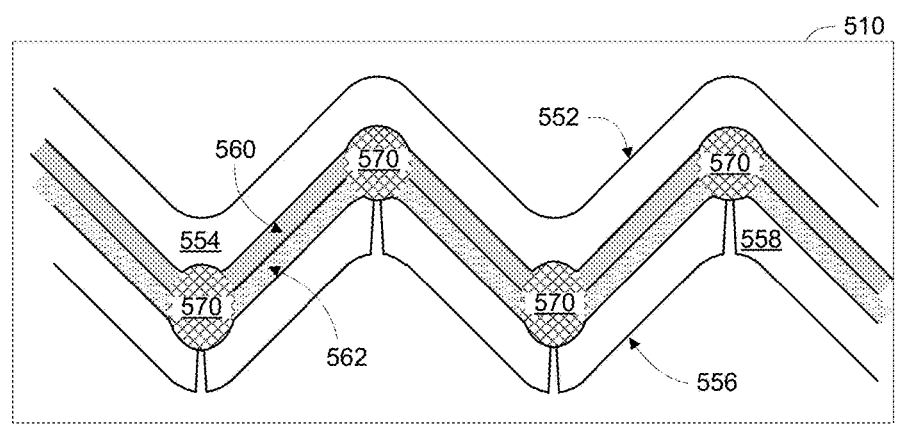

Although certain embodiment are not limited in this regard, regions 424 may form a repeating pattern, as represented by the illustrative tessellation 420 shown. Alternatively or in addition the shape and/or positioning of regions 424 may aid in the formation of a semi-rigid three-dimensional structure. By way of illustration and not limitation, FIG. 5 shows a semi-rigid structure 500 that may be formed by selective activation and folding of a flexible sheet according to an embodiment. Formation of semi-rigid structure 500 may include inducing a reaction, with a fluid compound disposed between sides 502, 504 of the flexible sheet, to form a solid along select regions of the flexible sheet. In the illustrative example shown in detail view 510, a first fluid compound 560 and a second fluid compound 562 may be disposed each in a respective cell or other sub-compartment of a compartment between an exterior side 552 of a layer portion 554 and an exterior side 556 of a layer portion 558. Cutting, scoring or other activation of the flexible sheet—e.g., through layer portion 558—may cause a reaction between fluid compounds 560, 562, where such reaction results in the formation of solids 570 at locations that extend along the cut, scored or otherwise activated regions. Prior to and/or during formation of the solid, these select regions may be variously and selectively folded to allow for set-up of at least semi-rigid bends in structure 500. As a result, structure 500 may serve as a column or other load-bearing body.

Figure 6:
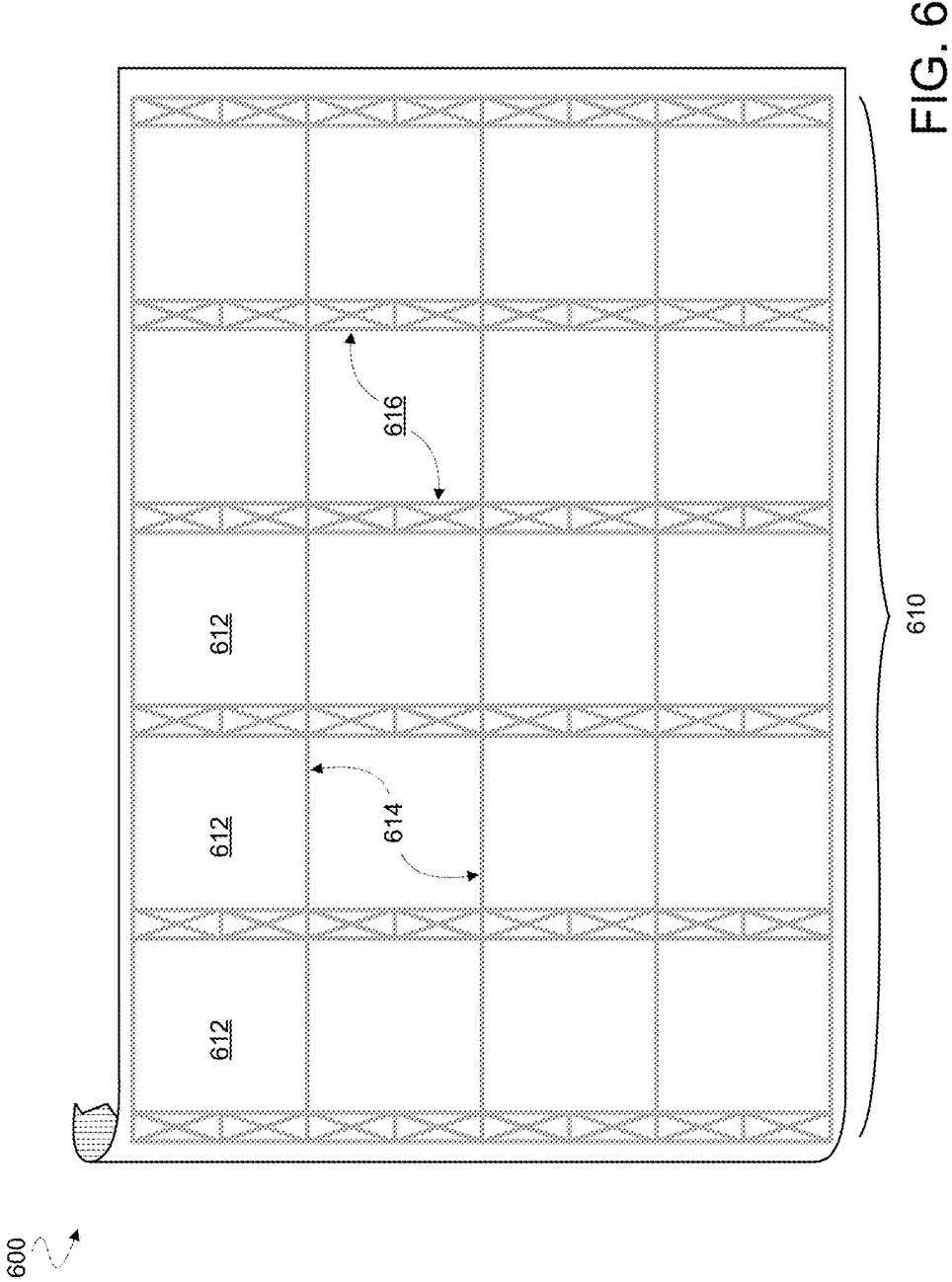
FIG. 6 is a top view diagram illustrating elements of a flexible sheet according to an embodiment.

FIG. 6 illustrates elements of a flexible sheet portion 600 that may be activated to form a different semi-rigid structure according to an alternative embodiment. Fabrication of flexible sheet portion 600 may include some or all operations of method 300, for example. Flexible sheet portion 600 provides another example of a pattern 610 that may be formed by regions 612 where opposing layers (e.g., layers 210, 220) of flexible sheet portion 600 are in direct contact with one another, and other regions 614, 616 where such layers of flexible sheet portion 600 are not in direct contact with one another. One or more compartments located in regions 614, 616 may have disposed therein a first fluid compound that is reactive to form a solid. In some embodiments, such one or more compartments, or one or more other compartments or regions 614, 616, have disposed therein a different fluid that is reactive with the first fluid compound. Graphics printed over or around regions 614, 616 may indicate the location of such compartments, a type of folding to be performed at such compartments, an order of activation/folding for different regions, etc.

Figure 7:
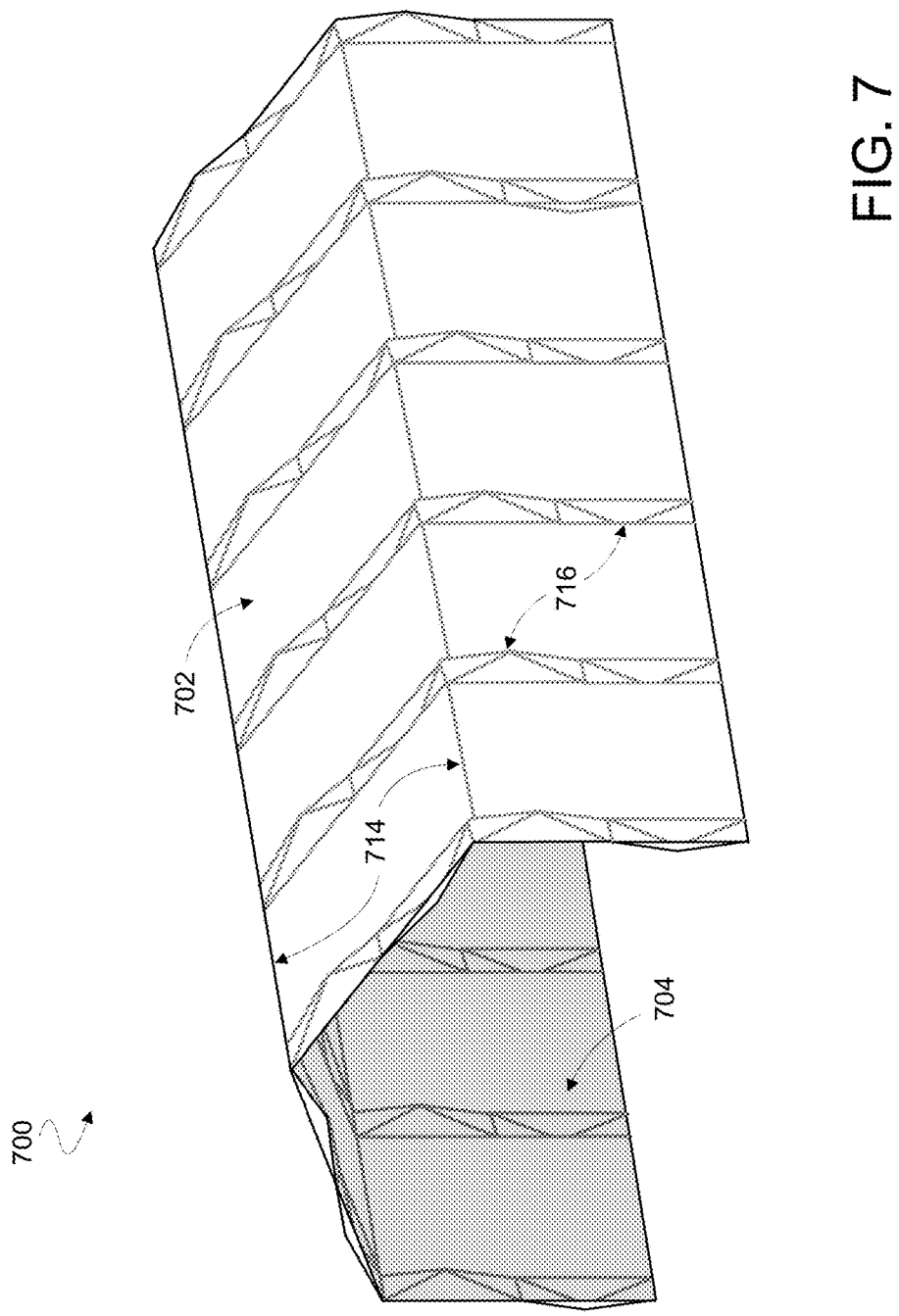
FIG. 7 is a perspective view diagram illustrating elements of a semi-rigid structure formed with a flexible sheet according to an embodiment.

Regions 614, 616 may form different sets of lines at different areas of flexible sheet portion 600—e.g., according to a particular semi-rigid structure to be shaped with flexible sheet portion 600. By way of illustration and not limitation, regions 614 may provide for piece-wise curving along a length of flexible sheet portion 600, where regions 616 instead provide for a formation of traverse support structures that extend athwart regions 614. FIG. 7 shows a semi-rigid structure 700 that may be formed by selective activation and folding of flexible sheet portion 600 according to an embodiment. Semi-rigid structure 700 may serve as a tent or other shelter structure including an exterior side 702 and an interior side 704. Chemical reaction by activation of a compound disposed in or on flexible sheet portion 600 may result in a solid product forming along folds 714, 716 (e.g., in regions 614, 616, respectively). As a result, lines of at least semi-rigid mechanical support may aid in resistance to tension, compression, torsion, shearing and/or other stresses on semi-rigid structure 700—e.g., due to its use, its own weigh and/or environmental conditions. Other structures (e.g., an arch, bridge, table, chair, raft) may be variously formed with flexible sheets having other patterns of enclosures according to different embodiments.

Techniques and architectures for forming an at least semi-rigid structure are described herein. Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A flexible sheet comprising:
    a first layer portion forming a first exterior surface of the flexible sheet;
    a second layer portion forming a second exterior surface of the flexible sheet; and
    first one or more compartments each disposed between the first exterior surface and the second exterior surface, the first one or more compartments defined at least in part by a seal where the first layer portion and the second layer portion are joined to one another, the first one or more compartments each having disposed therein a first fluid compound that is reactive to form a solid, wherein the first one or more compartments are organized into a tessellation pattern by the seal throughout the flexible sheet, wherein the first one or more compartments are adapted to confine the solid that is formed upon reaction of the first fluid compound.

2. The flexible sheet of claim 1, wherein the first one or more compartments form at least part of a pattern for a shelter.

3. The flexible sheet of claim 1, wherein the first one or more compartments form at least part of a pattern for a support column.

4. The flexible sheet of claim 1, wherein first one or more cells are disposed within the first one or more compartments, the first one or more cells each containing the first fluid compound.

5. The flexible sheet of claim 4, wherein second one or more cells are further disposed within the first one or more compartments, the second one or more cells each containing a second fluid compound, wherein the first fluid compound is reactive to the second fluid compound to form the solid.

6. The flexible sheet of claim 5, wherein respective portions of the first one or more cells and the second one or more cells are interleaved with each other.

7. The flexible sheet of claim 1, wherein the first fluid compound is directly in contact with the first layer portion or the second layer portion in the first one or more compartments.

8. The flexible sheet of claim 7, further comprising second one or more compartments each disposed between the first exterior surface and the second exterior surface, the second one or more compartments each having disposed therein a second fluid compound, wherein the first fluid compound is reactive to the second fluid compound to form the solid.

9. The flexible sheet of claim 1, further comprising a backing material between the first exterior surface and the second exterior surface, the backing material located in or adjacent to the first one or more compartments.

10. The flexible sheet of claim 1, further comprising:
    a graphic disposed on the first exterior surface and aligned over the first one or more compartments to indicate scoring lines or bending lines across the tessellation pattern that when scored or bent cause the first fluid compound to react and form the solid in a shape of the tessellation pattern within the one or more compartments.

11. The flexible sheet of claim 10, the graphic further indicating a direction of a bend to be made at the first one or more compartments.

12. The flexible sheet of claim 10, the graphic further indicating an order in which different regions of the flexible sheet are to be folded or activated.

13. A flexible sheet comprising:
    a first material layer forming a first exterior surface of the flexible sheet;
    a second material layer forming a second exterior surface of the flexible sheet; and
    compartments disposed between the first and second material layers, the compartments each defined by a seal formed by the first and second material layers joined together, wherein the compartments are organized into a pattern by the seal, the pattern repeating across the flexible sheet;
    a plurality of first cells disposed within and distributed about each of the compartments, the first cells each having disposed therein a first fluid compound that is reactive to form a solid when one or more of the first cells are ruptured, wherein the compartments are adapted to confine the solid that is formed upon reaction of the first fluid compound into the pattern after a rupture of the plurality of first cells; and wicking fibers disposed within, and limited to, the compartments, the wicking fibers disposed throughout the compartments about the first cells to distribute the first fluid compound via wicking throughout one or more of the compartments when the one or more of the first cells are ruptured.

14. The flexible sheet of claim 13, further comprising:

second cells disposed within and distributed about the compartments, the second cells each having disposed therein a second fluid compound that is reactive with the first fluid compound to form a solid when one or more of each of the first and second cells are ruptured within a given compartment, wherein the wicking fibers are also disposed about the second cells to encourage mixing of the first and second fluid compounds upon rupture.

15. The flexible sheet of claim 13, wherein the compartments are distributed in a tessellation pattern throughout the flexible sheet.

16. The flexible sheet of claim 13, wherein regions of the flexible sheet between the compartments where the first material layer is adhered to the second material layer remain flexible after the rupture forms the solid confined to one or more of the compartments.

* * * * *